US006187374B1

(12) United States Patent
Hardy et al.

(10) Patent No.: US 6,187,374 B1
(45) Date of Patent: Feb. 13, 2001

(54) COATINGS WITH INCREASED ADHESION

(75) Inventors: Richard D. Hardy, Westlake; Juan E. Jarufe, North Olmsted, both of OH (US)

(73) Assignee: XIM Products, Inc., Westlake, OH (US)

(*) Notice: Under 35 U.S.C. 154(b), the term of this patent shall be extended for 0 days.

(21) Appl. No.: 09/144,411

(22) Filed: Sep. 2, 1998

(51) Int. Cl.$^7$ .................................................... B32B 35/00
(52) U.S. Cl. ............................................. 427/140; 156/94
(58) Field of Search ............................... 427/140; 156/94

(56) References Cited

U.S. PATENT DOCUMENTS

| | | |
|---|---|---|
| 2,718,508 | 9/1955 | Rauner . |
| 3,378,520 | 4/1968 | Sattlegger et al. . |
| 3,488,208 | 1/1970 | Jinnette . |
| 3,505,269 | * 4/1970 | Jeffery et al. . |
| 3,547,766 | 12/1970 | Chu . |
| 3,634,542 | 1/1972 | Dowd et al. . |
| 3,874,903 | 4/1975 | Wirth et al. . |
| 3,909,494 | 9/1975 | Toepfl et al. . |
| 3,919,150 | 11/1975 | Kiel et al. . |
| 4,005,154 | 1/1977 | Bargain . |
| 4,021,396 | 5/1977 | Wu . |
| 4,049,745 | 9/1977 | Schuster et al. . |
| 4,055,541 | 10/1977 | Riew . |
| 4,081,492 | 3/1978 | Traenckner et al. . |
| 4,088,708 | 5/1978 | Riew . |
| 4,100,149 | 7/1978 | Meiller et al. . |
| 4,129,670 | 12/1978 | Riew . |
| 4,166,054 | 8/1979 | Meeske et al. . |
| 4,224,216 | 9/1980 | Locatelli et al. . |
| 4,250,068 | 2/1981 | Ali-Zaidi . |
| 4,253,918 | 3/1981 | Traenckner et al. . |
| 4,265,857 | 5/1981 | Kelada et al. . |
| 4,280,938 | 7/1981 | Strazik et al. . |
| 4,299,893 | 11/1981 | Pigeon et al. . |
| 4,307,001 | 12/1981 | Strazik et al. . |
| 4,340,453 | 7/1982 | Noomen . |
| 4,446,259 | 5/1984 | Vasta . |
| 4,487,805 | 12/1984 | Sellstrom . |
| 4,528,307 | 7/1985 | Fuhr et al. . |
| 4,546,153 | 10/1985 | Kamatani et al. . |
| 4,550,604 | 11/1985 | Sugimoto et al. . |
| 4,552,815 | 11/1985 | Dreher et al. . |
| 4,585,741 | 4/1986 | Clevinger et al. . |
| 4,599,196 | 7/1986 | de Tassigny . |
| 4,604,193 | 8/1986 | Lamort . |
| 4,629,637 | 12/1986 | Waldenrath et al. . |
| 4,666,954 | 5/1987 | Forgo et al. . |
| 4,707,432 | 11/1987 | Gatechair et al. . |
| 4,719,267 | 1/1988 | Rizk et al. . |
| 4,764,401 | 8/1988 | Sirinyan et al. . |
| 4,798,761 | 1/1989 | Wykowski et al. . |
| 4,818,613 | 4/1989 | Ohtani et al. . |
| 4,832,989 | 5/1989 | Giesecke et al. . |
| 4,855,184 | 8/1989 | Klun et al. . |
| 4,855,368 | 8/1989 | Tufts et al. . |
| 4,871,806 | 10/1989 | Shalati et al. . |
| 4,906,677 | 3/1990 | Barsotti et al. . |
| 4,973,649 | 11/1990 | Camberlin . |
| 4,981,885 | 1/1991 | Engel et al. . |
| 4,990,577 | 2/1991 | Noomen et al. . |
| 5,021,481 | 6/1991 | Galbo et al. . |
| 5,039,385 | 8/1991 | Tominaga . |
| 5,057,555 | 10/1991 | White et al. . |
| 5,068,153 | 11/1991 | Barsotti et al. . |
| 5,069,767 | 12/1991 | Tominaga . |
| 5,081,629 | 1/1992 | Criswell et al. . |

(List continued on next page.)

FOREIGN PATENT DOCUMENTS

| | | |
|---|---|---|
| 2631949 | 1/1978 | (DE) . |
| 3308186 | 9/1983 | (DE) . |
| 4416624 | 11/1995 | (DE) . |
| 19625266 | 1/1998 | (DE) . |
| 238174 | 9/1987 | (EP) . |
| 257480 | 3/1988 | (EP) . |
| 548413 | 6/1993 | (EP) . |
| 562660 | 9/1993 | (EP) . |
| 584041 | 2/1994 | (EP) . |
| 601400 | 6/1994 | (EP) . |
| 1222969 | 2/1971 | (GB) . |
| 2231905 | 11/1990 | (GB) . |
| 63-077927 | 4/1988 | (JP) . |
| 5051543 | 3/1993 | (JP) . |
| 5117558 | 5/1993 | (JP) . |
| 6157982 | 6/1994 | (JP) . |
| 6515336 | 5/1966 | (NL) . |
| 2088621 | 8/1997 | (RU) . |
| 9411426 | 5/1994 | (WO) . |
| 9411427 | 5/1994 | (WO) . |

OTHER PUBLICATIONS

Research Disclosure No. 309096, Jan., 1990.

*Primary Examiner*—Robert Dawson
*Assistant Examiner*—D. Aylward
(74) *Attorney, Agent, or Firm*—Watts Hoffman Fisher & Heinke

(57) ABSTRACT

A composition that can adhere to a substrate in an environment of hot water and soap includes: a. epoxy resin in an amount ranging from about 25.0 to about 60.0 parts by weight; b. acrylic resin in an amount ranging from about 5.00 to about 50.0 parts by weight; c. amine in an amount ranging from about 30.0 to about 45.0 parts by weight, wherein the amine is effective to crosslink the epoxy resin; and d. silane in an amount ranging from greater than 0 to about 10.0 parts by weight. Solvent may also be present in an amount ranging from 0 to 70.0% by weight based upon the total weight of the composition. The coating is applied to a substrate, such as those which have low surface tension and to which bonding is difficult. The substrate may be fastened to a construction material disposed in a sink, tub or shower area. The coating on at least a portion of the substrate is subjected to the environment of hot water and soap and adheres to the substrate despite exposure to the environment.

13 Claims, No Drawings

U.S. PATENT DOCUMENTS

| | | |
|---|---|---|
| 5,087,645 | 2/1992 | Kojima et al. . |
| 5,093,391 | 3/1992 | Barsotti et al. . |
| 5,145,920 | 9/1992 | Hess et al. . |
| 5,157,069 | 10/1992 | Campbell . |
| 5,162,426 | 11/1992 | Hazan et al. . |
| 5,283,290 | 2/1994 | Jung et al. . |
| 5,288,160 | 2/1994 | Li et al. . |
| 5,288,799 | 2/1994 | Schmid et al. . |
| 5,296,160 | 3/1994 | Tirpak et al. . |
| 5,318,851 | 6/1994 | Baron et al. . |
| 5,344,858 | 9/1994 | Hart et al. . |
| 5,471,027 | 11/1995 | Call et al. . |
| 5,476,749 | 12/1995 | Steinmann et al. . |
| 5,508,340 | 4/1996 | Hart . |
| 5,539,023 | 7/1996 | Dreischhoff et al. . |
| 5,587,409 | 12/1996 | Dreischhoff et al. . |
| 5,629,365 | 5/1997 | Razavi . |
| 5,684,070 | 11/1997 | Stevenson . |
| 5,691,006 | 11/1997 | Salvin et al. . |
| 5,691,416 | 11/1997 | Yoshida et al. . |
| 5,693,703 | 12/1997 | Hart . |
| 5,708,120 | 1/1998 | White . |
| 5,719,206 | 2/1998 | Mihoya et al. . |
| 5,726,255 | 3/1998 | Meixner et al. . |
| 6,020,028 * | 1/2000 | Kinneberg .................. 427/407.2 |

* cited by examiner

US 6,187,374 B1

COATINGS WITH INCREASED ADHESION

FIELD OF THE INVENTION

The invention is directed to a coating composition for bonding to substrates having low surface tension including porcelain, glazed ceramic and fiberglass.

BACKGROUND OF THE INVENTION

The ability to paint substrates that have low surface tension and are in need of refinishing, such as porcelain sinks and ceramic tile, offers a major cost savings compared to replacing the substrates. Many types of coatings and paints have been tried in the past for this purpose. Most air-dry, ambient curing coatings and paints do not bond well to porcelain or ceramic surfaces. The problem of maintaining adhesion to these surfaces is further complicated by a soapy, hot water environment in which these substrates are often used.

Ambient curing, two-component epoxy and polyurethane paints and coatings have had the best results in the past for this application. Some of these coatings may last for months or even years without failure when there is minimum use of the tub or sink. Their effectiveness is limited, however, when the coating is subjected to the soapy, hot water environment. These coatings fail rapidly and delaminate from the surface in a matter of hours once damaged or cut through ordinary use of the shower, tub or sink. The coating or paint fails when the film is undercut and loses its adhesive bond.

Thus, there is a need for a coating composition that provides a high quality, long-lasting finish that bonds to tough-to-coat substrates having low surface tension including porcelain and glazed ceramic surfaces such as those used in sinks, tubs, and showers.

SUMMARY OF THE INVENTION

The invention relates to a coating composition that not only bonds extremely well to substrates having low surface tension, such as glazed ceramic tile and porcelain surfaces, but also withstands the hot, soapy water environment of tubs, sinks and shower areas. This invention is also more advantageous than coatings that have been used in the past to paint porcelain and ceramic tubs, sinks and shower areas, because it maintains a strong bond to the surface that is capable of resisting peeling and delamination from the surface even if the coating is cut or damaged.

In general, the composition comprises:
a. epoxy resin in an amount ranging from about 25.0 to about 60.0 parts by weight;
b. acrylic resin in an amount ranging from about 5.00 to about 50.0 parts by weight;
c. amine in an amount ranging from about 30.0 to about 45.0 parts by weight; and
d. silane in an amount ranging from greater than 0 to about 10.0 parts by weight.

Solvent may optionally be used, the amount of solvent ranging from 0 to 70.0% by weight based upon the total weight of the composition.

In particular, the invention is directed to a two component coating. That is, some of the compounds of the coating composition are kept separate from others until application at which time the compounds of each component are mixed. The coating composition comprises a mixture of binder, solvent and pigment. The binder (after mixing the components) includes the following:

a. epoxy resin in an amount ranging from about 25.0 to about 60.0 parts by weight based upon the total weight of the binder, one suitable example being epichlorohydrin-bisphenol polymer;
b. acrylic resin in an amount ranging from about 5 to about 50.0 parts by weight based upon the total weight of the binder;
c. cycloaliphatic amine in an amount ranging from about 30.0 to about 45.0 parts by weight (from 0.85 to 1.15 amine equivalents per epoxy equivalent), preferred amines being selected from the group consisting of isophorone diamine, diamino cyclohexane, and 4,4 bis(para aminocyclohexyl)methane; and
d. organosilane in an amount ranging from greater than 0.0 to about 10.0 parts by weight, a preferred organosilane being an epoxy silane. The sum of the weights of the compounds of the binder preferably totals 100 parts by weight. Of course, other compounds (such as pigment) may be added to or omitted from a calculated formulation of the binder that has amounts of compounds that total 100 parts by weight, in which case the relative amounts of each of the compounds would be adjusted accordingly to total 100 parts by weight, as would be apparent to one skilled in the art in view of this disclosure.

The pigment is present in an amount ranging from 0.0 to 50.0 percent (%) Pigment Volume Concentration (PVC), where PVC is defined as the percentage of: the total volume of pigment to the sum of the total volume of the pigment and the total volume of binder, as follows:

$$PVC = \frac{Vp}{Vp + Vb}$$

where:
Vp is the total volume of pigment, and
Vb is the total volume of binder.

The coating composition comprises a mixture of volatile components (solvents) and non-volatile components (binder, pigment, non-volatile additives). Organic solvent carrier is preferably used in an amount ranging from about 30.0 to about 70.0% by weight based on the total weight of the coating composition. Other additives, including but not limited to surfactants and wetting agents, thickeners and viscosity builders, flow and leveling agents, and UV absorbers, may also be used in an amount up to about 5.0% by weight based upon the total weight of the coating composition.

Another form of the invention is directed to a coated substrate comprising a substrate and a protective coating on the substrate. The protective coating is formed of the inventive coating composition. At least a portion of the coated substrate is subjected to an environment of hot water and soap, and that portion is characterized by adhesion to the substrate despite exposure to the environment. The substrate may include or be fastened to a building material that is disposed in a tub, sink or shower area. The substrate may be ceramic tile and, in the case of glazed ceramic tile, the coating is adhered to the glaze. The substrate may also be porcelain whereby the coating adheres to the porcelain. Other substrates, selected from the grouping consisting of glass, formica, fiberglass, acrylic and plastic materials, may also be used.

A method of refinishing substrates comprises selecting at least one substrate in a tub, sink or shower area for refinishing. A coating having the inventive composition is applied to the substrate. The coating on at least a portion of the substrate is subjected to an environment comprising hot water and soap. The coating is characterized by adherence to the portion of the substrate despite exposure to the environment. The coating may be applied by troweling or skim-coating, but is preferably applied by spraying or painting onto the substrate.

The inventive coating is advantageous in that it can adhere to a substrate even when it is exposed to a hot, soapy water environment in sink, tub and shower areas. The coating may also be used in other wet, high temperature, high humidity environments, including those that subject the coating to soaps. The inventive coating is specially formulated to adhere exceptionally well to difficult-to-coat substrates having low surface tension such as glazed ceramic tile and porcelain. The inventive coating has such good adhesion it even adheres well in the hot soapy water environment when it is cut. The inventive coating is expected to last as much as five to ten times as long as conventional coatings in the hot, soapy water environment.

Other objects and a fuller understanding of the invention will be had from the following description of preferred embodiments.

DETAILED DESCRIPTION OF PREFERRED EMBODIMENTS

The present invention is an ambient curing, two-component epoxy composition including a binder comprising: epoxy resin in an amount ranging from 25.0 to about 60.0 parts by weight, even more preferably, from about 45.0 to about 55.0 parts by weight, based upon the total weight of the binder; acrylic resin in an amount ranging from about 5.00 to about 50.0 parts by weight, even more preferably, from about 7.00 to about 14.0 parts by weight, based upon the total weight of the binder; cycloaliphatic amine in an amount ranging from about 30.0 to about 45.0 parts by weight based upon the total weight of the binder, the cycloaliphatic amine being effective to cross-link the epoxy resin; and organosilane in an amount ranging from greater than 0 to about 10.0 parts by weight, even more preferably, from about 0.5 to about 1.0 parts by weight, based upon the total weight of the binder.

The composition of the invention forms a clear or pigmented coating which has excellent adhesion and bonding to surfaces having low surface tension, including porcelain and ceramic surfaces, in particular, those that are used in the construction of tubs, sinks and shower areas. The coating composition of this invention also bonds to fiberglass, Formica™ brand sheeting material, acrylic sheet and other plastic materials used in the construction of tubs, sinks and shower areas. Although the inventive coating is particularly advantageous in view of its ability to bond to substrates having low surface tension in areas in which the substrate is subjected to the hot, soapy water environment, the coating also bonds exceptionally well to substrates not exposed to this environment, and to substrates with higher surface tension such as ceramic substrates in which the glaze has been removed such as by sandblasting in preparation for refinishing.

The composition is a two component system, one component including the epoxy and the other component including the amine. The epoxy resins useful for this invention can have molecular weights ranging from about 300 to about 1000. Preferred epoxy resins of the present invention include those including epichlorohydrin-bisphenol polymers, for example, epoxy resins including epichlorohydrin-bisphenol A polymer such as Shell's commercial epoxy resin Epon 828, Shell's Epon 813 resin, which contains about 25% by weight of a low molecular weight glycidal ether to reduce viscosity, Shell's Epon 816, which contains about 15% by weight acrylic monomer, and Peninsula Polymers' PEP-6161 and PEP-6138. Other epoxy resins suitable for use in the present invention would be apparent to one skilled in the art in view of this disclosure. The epoxy resin has the following advantages: a. improving hot water resistance, b. improving soapy water resistance, c. providing excellent adhesion and wetting of the coating on the substrate, and d. providing excellent hardness and mar resistance.

The acrylic resins useful for this invention include both lower molecular weight acrylic monomers used as reactive diluents for the epoxy resins, as well as acrylic polymers used as non-reactive diluents. The acrylic polymers have a molecular weight that can range from about 30,000 to about 100,000. Suitable acrylic monomers include those based on acrylic acid and methacrylic acid, which may be used as adducts for the epoxy resin. Examples of reactive acrylic monomers include, but are not limited to, hexene diol diacrylate and trimethylol propane triacrylate. Acrylic polymers suitable for use in the invention are resins that are based on esters of acrylic acid or methacrylic acid and mono- or multi-functional alcohols. The preferred acrylic resins are polymers based on methyl methacrylate and methyl methacrylate copolymers, including the copolymer, methyl methacrylate/N-butyl methacrylate/N-butyl acrylate/diethyl aminoehtyl methacrylate, and the copolymer, isobutyl methacrylate/diethyl aminoethyl methacrylate; these preferred acrylic polymers may be supplied by Dianal under the product names, BR121DA and BR115A, respectively. Other acrylic resins suitable for use in the present invention would be apparent to one skilled in the art in view of this disclosure.

The acrylic resin advantageously provides the following functions in the composition: a. improving heat stability of the coating; b. improving light stability (reduced yellowing) of the coating; c. improving moisture and humidity resistance of the coating; d. improving adhesion of the coating on the substrate; e. improving soapy water resistance; f. reducing drying time; g. improving mar resistance; and h. reducing chalking of the epoxy resin.

The amine used in this invention for curing the epoxy resin, is present in an amount of about 0.85 to 1.15 amine equivalents (active amine hydrogen equivalent weight of the amine or amine resin) mixed with each epoxy resin equivalent (epoxy equivalent weight of the epoxy resin). the amine not only cross-links with the epoxy resin but also can react with any available reactive sites on the acrylic resin. The amount of amine equivalent per epxoy equivalent, 0.85 to 1.15, results in high cross-linking density and is believed to contribute to providing the coating with improved performance.

The use of cycloaliphatic amines is preferred and is believed to improve the coating's resistance to hot water and to give greater resistance to coating failure with temperature change. Cycloaliphatic amines generally have low color and excellent color retention and, therefore, aid in reducing yellowing of the coating. The cycloaliphatic amines, which are used as cross-linkers for the epoxy resins, show superior film integrity in hot water resistance compared to the use of polyamides. Examples of suitable cycloaliphatic amines are isophorone diamine, diamino cyclohexane, and 4,4 bis(para aminocyclohexyl)methane. Commercial cycloaliphatic amines suitable for this invention include, but are not limited to Shell's Epi-Cure 3383, Shell's Epi-Cure 3373, Shell's Epi-Cure 3382 and Peninsula Polymers' PEP-9937 and PEP-9355. Cycloaliphatic amines are believed to be most effective when they are modified with acid catalysts such as salicylic acid. It is also preferred to use cycloaliphatic amines that are pre-reacted or adducted with small amounts of epoxy resin. Other suitable cycloaliphatic amines for use in the present invention would be apparent to one skilled in the art in view of this disclosure.

The cycloaliphatic amine provides the following functions: a. improving resistance to hot water; b. increasing resistance of coating failure with temperature change; c. reducing yellowing of the coating in view of the low color and low color retention of the amine; d. improving soapy water resistance.

The silanes that are preferably used are organosilanes, more preferably, organosilicon monomers which are represented by the formula: (R)—$SiX_3$, Where (R) is an organofunctional group attached to silicon and X is a hydrolyzable group. Most preferably, (R) is comprised of a reactive organic group ($R^1$) separated by the propylene group (—$CH_2CH_2CH_2$—) from the silicon, and X is an alkoxy group, usually methoxy. Including a silane in the coating composition aids in adhesion of the coating to the substrate of low surface tension, including porcelain, ceramic or plastic surfaces. The presence of the silane improves the resistance of the coating to attack by moisture and assists in binding the compounds of the coating to prevent film cracking and fracture. This is especially important in preventing peeling and delamination if the coating is cut or damaged.

Examples of suitable organosilanes include trimethoxysilanes, where ($R^1$) is a diamino group as present in N-(2-aminoethyl)-3-aminopropyltrimethoxy silane represented by Dow Corning's Z-6020 and a styrylamine group as present in N-((2-vinylbenzylamino)-ethyl-3-aminopropyltrimethoxy silane represented by Dow Corning's Z-6032. A preferred organosilane is an epoxy silane, more specifically, a glycidyl organosilane, for example, 3-glycidoxy-propyltrimethoxy silane, such as that supplied by Dow Corning under the product name Z-6040. Other organosilanes suitable for use in the present invention would be apparent to one skilled in the art in view of this disclosure.

The presence of the organosilane provides the following functions: a. improving adhesion to the substrate, especially to surfaces such as porcelain, glazed ceramic, fiberglass or plastic surfaces; b. improving resistance of the coating to attach by moisture and assisting binding of the components of the coating to prevent film cracking and failure, which is important in preventing the coating from peeling and delaminating if the coating is cut or damaged; c. improving soapy water resistance; and d. improving hot water resistance.

Typical pigments include titanium dioxide such as that supplied by Dupont under the product names, Ti-Pure R706, Ti-Pure R902 and Ti-Pure R900; aluminum silicate (clay) such as that supplied by ECC International under the product names, Ecca-Tex 610, Ecca-Tex 611 and Ecca-Tex 621; magnesium silicate (talc) such as that supplied by Suzorite under the product names, BT-2202A and BT-2203A; calcium metasilicate such as that supplied by Nyco Minerals under the product names Nyad-400, Nyad-1250 and Wollastocoat-10ES; and carbon black such as that supplied by Daniel Products under the product names, TintAyd, ST-1355 and AL-317H. Other pigments suitable for use in the present invention would be apparent to one skilled in the art in view of this disclosure. All of the above are heat/light stable colored pigments. The functions of the pigments in the composition include the following: a. hiding the substrates, b. controlling to coating gloss, c. assisting in the flow and leveling at application, d. acting as a filler and bulking agent, and e. supporting resistance to soapy water.

Solvents that are suitable for use in the invention include toluene; xylene; ketones such as methyl ethyl ketone, methyl isobutyl ketone and methyl propyl ketone; glycol ethers; and glycol ether acetates such as dipropylene glycol methyl ether actetate. These solvents may be supplied by companies such as Shell and Eastman. In addition, alcohol solvents are useful in the epoxy formulations, examples of which include isopropyl alcohol, N-butyl alcohol, tertiary butyl alcohol and methanol. Other solvents suitable for use in the present invention would be apparent to one skilled in the art in view of this disclosure.

The solvent may be omitted in which case the coating may be applied by troweling, skim coating and the like. If the coating is applied in the form of a paint the amount of solvent ranges from 0 to approximately 70.0% based upon the total weight of the composition. If the coating is to be sprayed, the amount of solvent ranges from about 30.0 to about 70.0% based upon the total weight of the composition. The functions of the organic solvent(s) include: a. thinning the coating composition for application, b. improving flow and leveling of the coating composition at application, and c. wetting of low surface tension substrates.

The coating composition may also contain chemical additives. These additives can include but are not limited to surfactants and wetting agents, thickeners and viscosity builders, flow and leveling agents, and UV absorbers. Examples of surfactants and wetting agents are acetylenic compounds such as those supplied by Air Products under the product names, Surfynol HS30 and Surfynol HS45, and polysiloxane copolymers such as those supplied by Goldschmidt under the product names, TegoWet 260 and Tegoglide 100. Examples of suitable thickeners and viscosity builders are polyamides such as that supplied by King Industries under the product name, Disparlon 6500, and organoclays such as that supplied by Sud Chemie under the product name, Tixogel MP 250. Examples of flow and leveling agents are acrylic copolymers such as that supplied by Monsanto under the product name, Multiflow Resin, and polysiloxane copolymers such as those supplied by Goldschmidt under the product names, TegoGlide 420 and Tegoflow 300. Examples of suitable UV absorbers include sterically hindered tertiary amine light stabilizers and hydroxy phenyl benzotriazoles such as those supplied by Ciba Geigy under the product names, Tinuvin 213, Tinuvin 292 and Tinuvin 1130. Other additives suitable for use in the present invention would be apparent to one skilled in the art in view of this disclosure.

The chemical additives have the following functions: a. improving wetting of the substrate surface, e.g. porcelain, ceramic, fiberglass, or plastic, and improving binder contact with the surface; b. aiding dispersion of the pigments; c. aiding flow and leveling of the coating film during application; d. reducing settling of the pigments in the can; and e. reducing yellowing of the cured coating film.

The invention will now be described by reference to the following non-limiting examples.

EXAMPLE 1

One formulation of the composition for a gloss white coating is as follows.

| Component | Parts by weight |
|---|---|
| PART A | |
| Cycloaliphatic Amine | 14.62 |
| Xylene | 8.98 |
| N-butyl alcohol | 0.91 |
| Dipropylene glycol mono-methyl ethet acetate | 2.74 |
| Surfactant(s) and additives | 0.58 |
| Titanium dioxide | 33.35 |
| Blue Toner | 0.01 |
| Tinuvin 1130 | 0.09 |
| Tinuvin 292 | 0.05 |
| PART B | |
| Epoxy Resin | 20.04 |
| Acrylic Resin | 3.53 |
| Xylene | 15.01 |
| Epoxy silane | 0.09 |
| TOTAL | 100.00 |

EXAMPLE 2

Another formulation of the composition for a semi gloss white coating is as follows.

| Component | Parts by Weight |
|---|---|
| PART A | |
| Cycloaliphatic Amine | 14.62 |
| Xylene | 8.98 |
| N-butyl alcohol | 0.91 |
| Dipropylene glycol mono-methyl ether acetate | 2.74 |
| Surfactant(s) and additives | 0.58 |
| Titanium dioxide | 20.15 |
| Aluminum Silicate | 6.60 |
| Magnesium Silicate | 6.60 |
| Blue Toner | 0.01 |
| Tinuvin 1130 | 0.09 |
| Tinuvin 292 | 0.05 |
| PART B | |
| Epoxy Resin | 20.04 |
| Acrylic Resin | 3.53 |
| Xylene | 15.01 |
| Epoxy Silane | 0.09 |
| TOTAL | 100.00 |

EXAMPLE 3

Another formulation of the composition for a gloss black composition is as follows.

| Component | Parts by Weight |
|---|---|
| PART A | |
| Cycloaliphatic Amine | 14.62 |
| Xylene | 21.18 |
| Isopropyl Alcohol | 0.92 |
| Methyl Isobutyl Ketone | 3.51 |
| Surfactant(s) and additives | 0.76 |
| Black Toner | 4.78 |
| Aluminum Silicate | 7.37 |
| Blue Toner | 0.01 |
| Tinuvin 1130 | 0.09 |
| Tinuvin 292 | 0.05 |
| Methyl isobutyl ketone | 5.00 |
| PART B | |
| Epoxy Resin | 20.04 |
| Acrylic Resin | 3.53 |
| Xylene | 15.01 |
| Methyl Isobutyl Ketone | 3.04 |
| Epoxy Silane | 0.09 |
| TOTAL | 100.00 |

EXAMPLE 4

Yet another example of a formulation for a gloss clear coating is as follows.

| Component | Parts by Weight |
|---|---|
| PART A | |
| Cycloaliphatic Amine | 22.08 |
| Xylene | 13.56 |
| N-butyl alcohol | 1.38 |
| Dipropylene glycol mono-methyl ether acetate | 4.14 |
| Surfactant(s) | 0.10 |
| Tinuvin 1130 | 0.14 |
| Tinuvin 292 | 0.07 |
| PART B | |
| Epoxy Resin | 30.27 |
| Acrylic Resin | 5.34 |
| Xylene | 22.78 |
| Epoxy Silane | 0.14 |
| TOTAL | 100.00 |

EXAMPLE 5

A composition was prepared with the following formula to produce a gloss white coating, pigmented in the epoxy component.

| Component | Parts by Weight |
|---|---|
| PART A | |
| Epoxy Resin | 20.04 |
| Acrylic Resin | 3.53 |
| Surfactant(s) and additives | 0.57 |
| Titanium dioxide | 33.35 |
| Xylene | 15.11 |
| PART B | |
| Cycloaliphatic Amine | 14.62 |
| Xylene | 8.98 |
| N-butyl alcohol | 0.91 |
| Dipropylene glycol mono-methyl ether acetate | 2.74 |
| epoxy silane | 0.15 |
| TOTAL | 100.00 |

EXAMPLE 6

A composition was prepared with the following formula to produce a pastel tinted white coating.

| Component | Parts by Weight |
|---|---|
| PART A | |
| Cycloaliphatic Amine | 14.62 |
| Xylene | 8.98 |
| N-butyl alcohol | 0.91 |
| Dipropylene glycol mono-methyl ether acetate | 2.74 |
| Surfactant(s) and Additives | 0.58 |
| Titanium Dioxide | 20.15 |
| Aluminum silicate | 6.60 |
| Magnesium silicate | 6.60 |
| PART B | |
| Epoxy Resin | 20.04 |
| Acrylic Resin | 15.00 |
| Xylene | 3.58 |
| Epoxy Silane | 0.20 |
| TOTAL | 100.00 |

COMPARATIVE EXAMPLE 1

Preparation of a coating with the following formulation shows the effect of leaving out acrylic resin.

| Component | Parts by Weight |
|---|---|
| PART A | |
| Cycloaliphatic Amine | 14.62 |
| Xylene | 8.98 |
| N-butyl alcohol | 0.91 |
| Dipropylene glycol mono-methyl ether acetate | 2.74 |
| Surfactant(s) and Additives | 0.58 |
| Titanium Dioxide | 33.35 |
| PART B | |
| Epoxy Resin | 23.58 |
| Xylene | 15.12 |
| Epoxy Silane | 0.12 |
| TOTAL | 100.00 |

COMPARATIVE EXAMPLE 2

Preparation of a coating with the following formulation shows the effect of leaving out acrylic resin and organosilane.

| Component | Parts by Weight |
|---|---|
| PART A | |
| Cycloaliphatic Amine | 14.62 |
| Xylene | 8.98 |
| N-butyl alcohol | 0.91 |
| Dipropylene glycol mono-methyl ether acetate | 2.74 |
| Surfactant(s) and Additives | 0.58 |
| Titanium Dioxide | 33.35 |
| PART B | |
| Epoxy Resin | 23.67 |
| Xylene | 15.16 |
| TOTAL | 100.01 |

COMPARATIVE EXAMPLE 3

Preparation of a coating with the following formulation shows the effect of leaving out acrylic resin and the organosilane and using a polyamide crosslinker.

| Component | Parts by Weight |
|---|---|
| PART A | |
| Polyamide | 20.62 |
| Xylene | 2.96 |
| N-butyl alcohol | 0.91 |
| Dipropylene glyol mono-methyl ether acetate | 2.74 |
| Surfactant(s) and Additives | 0.60 |
| Titanium Dioxide | 33.35 |
| PART B | |
| Epoxy Resin | 23.67 |
| Xylene | 15.15 |
| TOTAL | 100.00 |

COMPARATIVE EXAMPLE 4

Preparation of a coating with the following formulation shows the effect of using an aliphatic amine crosslinker.

| Component | Parts by Weight |
|---|---|
| PART A | |
| Aliphatic amine | 14.15 |
| Xylene | 9.44 |
| N-butyl alcohol | 0.91 |
| Dipropylene glycol mono-methyl ether acetate | 2.74 |
| Surfactant(s) aud Additives | 0.58 |
| Titanium Dioxide | 33.35 |
| PART B | |
| Epoxy Resin | 20.04 |
| Acrylic Resin | 3.53 |
| Xylene | 15.17 |
| Epoxy Silane | 0.09 |
| TOTAL | 100.00 |

COMPARATIVE EXAMPLE 5

Preparation of a coating with the following formulation shows the effect of using a epoxy resin, cycloaliphatic amine and acrylic resin, but leaving the silane out of the formula.

| Component | Parts by Weight |
|---|---|
| PART A | |
| Cycloaliphatic amine | 14.62 |
| Xylene | 8.98 |
| N-butyl alcohol | 0.91 |
| Dipropylene glycol monomethyl ether acetate | 2.74 |
| Surfactant(s) and Additives | 0.57 |
| Titanium Dioxide | 33.35 |
| PART B | |
| Epoxy Resin | 20.13 |
| Acrylic Resin | 3.53 |
| Xylene | 15.17 |
| TOTAL | 100.00 |

In all of Examples 1–6 and Comparative Examples 1–5 herein, wherein pigments are present in Part A, the components of Part A were ground in a high speed disperser for 20 minutes to a fineness of 7 Hegman at less than 140° F. The components of Part B were mixed separately for 10 minutes. In use, Part A is poured into Part B and thoroughly mixed by hand. The composition is then ready for application such as by painting or spraying.

Experimental Results

1. Hot Water Immersion

The following tests were carried out on each of the formulations of Examples 1–6 and Comparative Examples 1–5. In this test, the coating must be able to withstand a minimum of 30 days of continuous water immersion, each day brining the water temperature to 140° F. then allowing to cool to room temperature.

A standard four inch square glazed ceramic tile, porcelain and fiberglass sheet were used as substrates. The surface of the substrate was cleaned using a strong detergent Spic and Span™ brand abrasive cleaner, and dried. The surface was then solvent wiped with xylene to remove any remaining contamination.

Two coats were applied by spray application. The first coat was applied at 1.0 mil dry film thickness (DFT). After 10–20 minutes were allowed to pass for flash off, the second coat was applied at 1.0 mil dry film thickness (DFT) for a total of 2.0 mils DFT. The coating was allowed to air dry at standard conditions (77° F. and 50% relative humidity) for a minimum of 7 days or full cure. Alternatively, brush application can be used to apply a coating having the above dry film thickness.

Using a razor knife, the surface of the coating was cut in cross-hatch fashion (i.e., forming an X) down to the underlying substrate, e.g., to the underlying glaze of the ceramic substrate or to the underlying porcelain surface. The coated substrate was placed into a tray containing tap water which covered ⅔ of the coated surface and the cross hatch. The remaining ⅓ of the substrate and cross-hatch was not immersed in the water so that this portion of the substrate was exposed to hot water vapor. Each day the temperature of the water was raised to 140° F. and then the water was allowed to cool to room temperature. The test was continued for a minimum of 30 days.

The substrate was removed from the water. Immediately after removal from the water the cross-hatched area was brushed with a medium bristle scrub brush to check for film undercutting and loss of adhesion. Any loss of adhesion is a failure. The coating compositions described herein in Examples 1–6 all passed this test, showing no loss of adhesion or undercutting of the coating film. The results of testing the compositions of Comparative Examples 1–5 in this manner are shown in Table 1 hereafter.

2. Boiling Water Immersion

The following boiling water immersion test was carried out to illustrate the ability of the coating to withstand direct exposure to boiling water. The coating must be able to withstand three, one hour boiling water immersions with cooling to room temperature for one hour periods between boiling water immersions. The same substrates, surface preparation, coating application and coating preparation that were described in hot water immersion test were used.

The coated substrate was placed into boiling water cover ⅔ of the coated surface and the cross-hatch for one hour. The substrate was removed and allow to cool for one hour. The one hour boiling and cooling steps were repeated immediately twice more for a minimum of three cycles.

Immediately after removal from the water, the cross-hatched area was brushed using a medium bristle scrub brush, to check for film undercutting and loss of adhesion. Any loss of adhesion is a failure. The coating compositions described in Examples 1–6 all passed this test, showing no loss of adhesion or undercutting of the coating film. The results of testing the compositions of Comparative Examples 1–5 in this manner are shown in Table 1 hereafter.

3. Soapy Water Immersion

The following soapy water immersion test was carried out to determine the performance of the inventive coatings in the chemical environment of sinks and showers. The coating must be able to withstand a minimum of 15 hours of continuous soapy water immersion, wherein the soapy water includes a minimum of 2% of a water softening chemical and bar soap in contact with the scribe. The same substrates, surface preparation, coating application and coating preparation that were described in the hot water immersion test were used.

The coated substrate was placed flat on the bottom of a tray containing tap water with a minimum of 2% water softening chemical such as Calgon™ brand water softener and covering 100% of the coated surface and the cross hatch. A soap bar was placed on the cross-hatched area. The water temperature was maintained at room temperature. The test was continued for a minimum of 15 hours.

The substrate was removed from the water. The cross-hatched area was brushed using a medium bristle scrub brush, to check for film undercutting and loss of adhesion. Any loss of adhesion is a failure. The coating compositions described in Examples 1–6 all passed this test, showing no loss of adhesion or undercutting of the coating film. The results of testing the compositions of Comparative Examples 1–5 in this manner are shown in Table 1 hereafter.

4. Pressure-Sensitive Tape Adhesion

The following cross-hatch adhesion tests were carried out based upon ASTM D 3359-87 to measure the adhesion of the coating film to the substrate by applying and removing pressure-sensitive tape over cuts made in the film. The same substrates, surface preparation, coating application and coating preparation that were described in the hot water immersion test were used.

Pressure-sensitive tape such as that supplied by KTA Tator under the product name, Permacel P-99, was pressed onto the coating voer the cut and then removed. The adhesion was measured qualitatively on the scale of 0 to 5, where 5 indicates no peeling or removal of the coating and 0 indicates removal in and beyond the area of the cross-hatched cut. The coatings tested in Examples 1–6 above were all tested and rated 5—no peeling or removal of the coating film. The results of testing the compositions of Comparative Examples 1–5 in this manner are shown in Table 1 hereafter.

5. Humidity

The following tests were carried out based upon ASTM D 2247-87 to measure the water resistance of the coatings by exposing coated substrates to an atmosphere maintained at 100% relative humidity so that condensation forms on the substrates. The same substrates, surface preparation, coating application and coating preparation that were described in the hot water immersion test were used.

The coated substrates were placed in an enclosed chamber containing a heater, saturated mixture of air and water vapor. The temperature of the chamber was maintained at 100° F. At 100% relative humidity a small temperature difference between the substrates and the surrounding vapor causes the formation of condensation on the substrates.

The coatings were inspected for any effects such as color change, blistering, loss of adhesion, softening or embrittlement. The coatings having the compositions described in Examples 1–6 all showed no loss of adhesion or undercutting of the coating film and only a few small blisters after 500 hours in the humidity chamber. The results of testing the compositions of Comparative Examples 1–5 in this manner are shown in Table 1 hereafter.

The improved performance of the coating made according to the inventive composition is illustrated by the following Table 1 in which the compositions of Comparative Examples 1–5 having one or more components removed or substituted did not pass some of the performance tests.

TABLE 1

| Comp. Ex. No. | Epoxy (Epichloro hydrin- Bisphenol A type) | Acrylic Methyl methacryl- ate monomer or polymer | Amine Cyclo- aliphatic | Organo- silane (3- Glycidoxy propyl trime- thoxy) | Test Results Failed Test Nos.: |
|---|---|---|---|---|---|
| 1 | Yes | No | Yes | Yes | 1, 3, 5 film cracks/peels |
| 2 | Yes | No | Yes | No | 1, 3, 5 film cracks/peels |
| 3 | Yes | No | No Poly- amide- Shell's Epicure 3125 | No | 1, 2, 3, 5 film delaminates |
| 4 | Yes | Yes | No Aliphatic- Shell's Epicure 3277 and 3271 | Yes | 1, 2, 3, 5 film delaminates |
| 5 | Yes | Yes | Yes | No | 1, 3 film delaminates |

The above tests in Table 1 show that the comparative compositions do not achieve the performance of the inventive compositions when the acrylic alone (Comparative Example 1), or the acrylic and silane (Comparative Example 2), are absent. These compositions failed the hot water immersion, soapy water immersion, and humidity tests. The composition of Comparative Example 3 also failed the boiling water immersion test when the amine was also absent, compared to Comparative Example 2. Comparative Example 4 shows that in some cases, the use of a cycloaliphatic amine is preferred, since the aliphatic amine that was used made the composition brittle and the coating failed the hot water immersion, the boiling water immersion, the soapy water immersion and the humidity tests. Comparative Example 5 shows the advantageous effect of the organosilane; without it the coating failed the hot water immersion and the soapy water immersion tests.

Many modifications and variations of the invention will be apparent to those skilled in the art in view of the foregoing disclosure. Therefore, it is to be understood that the invention can be practiced within the scope of the appended claims, otherwise than as specifically disclosed herein.

What is claimed is:

1. A method of refinishing substrates, comprising:
    selecting at least one substrate in a tub, sink or shower area for refinishing;
    applying to said substrate a coating having a composition comprising:
        a. epoxy resin in an amount ranging from about 25.0 to about 60.0 parts by weight,
        b. acrylic resin in an amount ranging from about 5.00 to about 50.00 parts by weight, said acrylic resin being based on one of acrylic acid and methacrylic acid,
        c. amine in an amount ranging from about 30.0 to about 45.0 parts by weight, wherein the amine is effective to crosslink said epoxy resin, and
        d. silane in an amount ranging from greater than 0 to about 10.0 parts by weight; and
    subjecting the coating on at least a portion of said substrate to an environment comprising hot water and soap, wherein said coating is characterized by adherence to said portion of said substrate despite exposure to said environment.

2. The method of claim 1 wherein said coating is applied by spraying onto said substrate.

3. The method of claim 1 wherein said coating is applied by painting onto said substrate.

4. The method of claim 1 wherein said coating is applied to ceramic tile as said substrate.

5. The method of claim 4 wherein said coating is applied by to a glazed finish of said ceramic tile and adheres to said glazed finish.

6. The method of claim 1 wherein said coating is applied to porcelain as said substrate.

7. The method of claim 1 comprising solvent in an amount ranging from 0 to 70.0% by weight based upon the total weight of the composition.

8. A method of refinishing substrates, comprising:
    selecting at least one substrate in a tub, sink or shower area for refinishing;
    applying to said substrate a coating having a composition comprising:
        a. epoxy resin in an amount ranging from about 25.0 to about 60.0 parts by weight,
        b. acrylic resin in an amount ranging from about 5.00 to about 50.0 parts by weight, said acrylic resin being in the form of at least one of a nonreactive acrylic polymer, a nonreactive acrylic copolymer, and a reactive adduct for said epoxy resin;

c. amine in an amount ranging from about 30.0 to about 45.0 parts by weight, wherein the amine is effective to crosslink said epoxy resin, and d. organosilane in an amount ranging from greater than 0 to about 10.0 parts by weight; and subjecting the coating on at least a portion of said substrate to an environment comprising hot water and soap, wherein said coating is characterized by adherence to said portion of said substrate despite exposure to said environment.

9. The method of claim 8 wherein said acrylic resin comprises at least one of hexene diol diacrylate adduct monomer and methyl methacrylate/N-butyl methacrylate/N-butyl acrylate/diethyl aminoethyl methacrylate copolymer.

10. The method of claim 8 wherein said organosilane is an epoxy organosilane.

11. The method of claim 10 wherein said epoxy organosilane comprises 3-glycidoxy-propyltrimethoxy silane.

12. The method of claim 1 wherein said acrylic is based on a compound selected from the group consisting of monomers of acrylic acid, monomers of methacrylic acid, and polymers based on esters of acrylic acid or methacrylic acid and alcohol.

13. The method of claim 1 wherein said amine comprises a cycloaliphatic amine.

\* \* \* \* \*